Aug. 27, 1929. H. OSBORNE 1,726,276
REGENERATIVE BRAKING SYSTEM
Filed March 14, 1924   2 Sheets-Sheet 1

Inventor
Heinrich Osborne
by Knight Bro.
Attorneys

Aug. 27, 1929.  H. OSBORNE  1,726,276
REGENERATIVE BRAKING SYSTEM
Filed March 14, 1924  2 Sheets-Sheet 2

Inventor:
Heinrich Osborne
by Knight & Bro.
his attys.

Patented Aug. 27, 1929.

1,726,276

UNITED STATES PATENT OFFICE.

HEINRICH OSBORNE, OF BERLIN-WILMERSDORF, GERMANY, ASSIGNOR, BY MESNE ASSIGNMENTS, TO WESTINGHOUSE ELECTRIC & MANUFACTURING COMPANY, A CORPORATION OF PENNSYLVANIA.

REGENERATIVE BRAKING SYSTEM.

Application filed March 14, 1924, Serial No. 699,280, and in Germany March 23, 1923.

My invention relates to improvements in regenerative braking systems for converting any surplus of mechanical energy of electrically operated machines into electrical energy.

I will more fully describe my invention in connection with electric railway motors.

Electric railway motors, which should return current into the supply circuit when the train descends a gradient or during the braking of the train must be provided with shunt excitation or operate with shunt characteristic. It is well known that such motors have the inherent drawback that owing to the stability of their field even small variations of their speed at constant exciter voltage cause strong surges of current. In order to render the current surges harmless, steadying resistances are inserted into the main circuit. These resistances become very large and inasmuch as they convert a considerable proportion of the energy to be recovered uselessly into heat their application is by no means economical.

More favorable in its action is the arrangement of a compound winding, in which besides the shunt winding a series winding is provided. During the return of current into the supply circuit, the current flowing through the series winding will then weaken the field at the same rate at which the current flowing back increases, so that the current only gradually increases with the speed. Such a compound winding has, however, the disadvantage, that its manufacture is expensive and that it takes up a considerable amount of space, which is very undesirable in view of the compact construction of railway motors.

I have found that it is possible to avoid these disadvantages while adhering to the principle of weakening the field, if according to my invention a resistance is connected in the armature circuit of the motors, which during the recovery of current reduced the field strength. The motors or groups of motors are hereby connected in series with each other. The system according to my invention is applicable to shunt as well as to series motors, but it is then necessary that in front of the series field windings, which must be connected in shunt, resistances be inserted.

Figure 1:
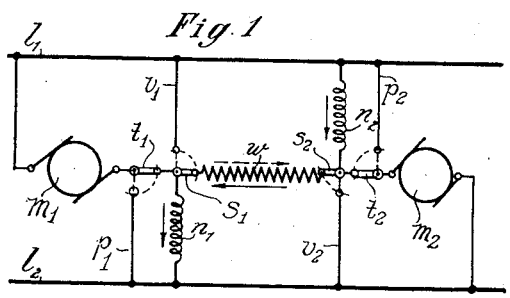

In the drawing affixed to this specification and forming part thereof several diagrams of circuit connections of various systems embodying my invention are shown, Fig. 1 illustrating the brake period connection in accordance with the invention arranged for shunt motors.

Figure 2:
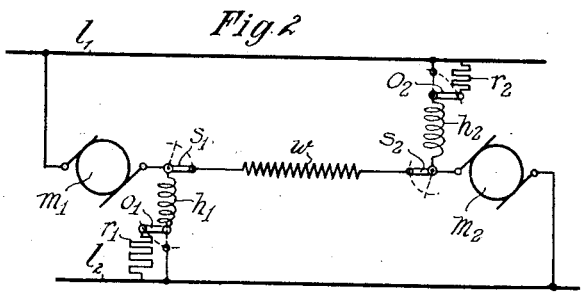

Fig. 2 illustrating the brake connection for series motors having a resistance connected with each series winding during the braking period.

Figure 3:
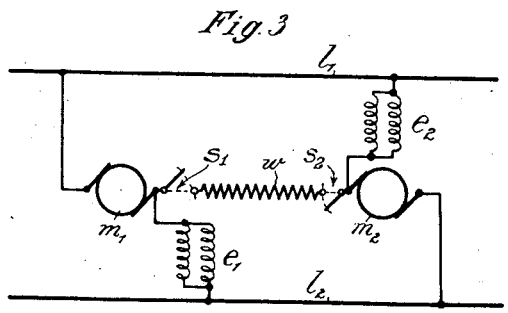
Figure 4:
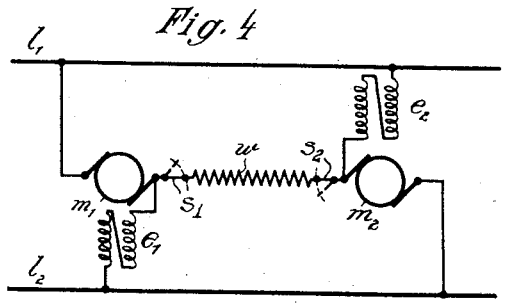
Figure 5:
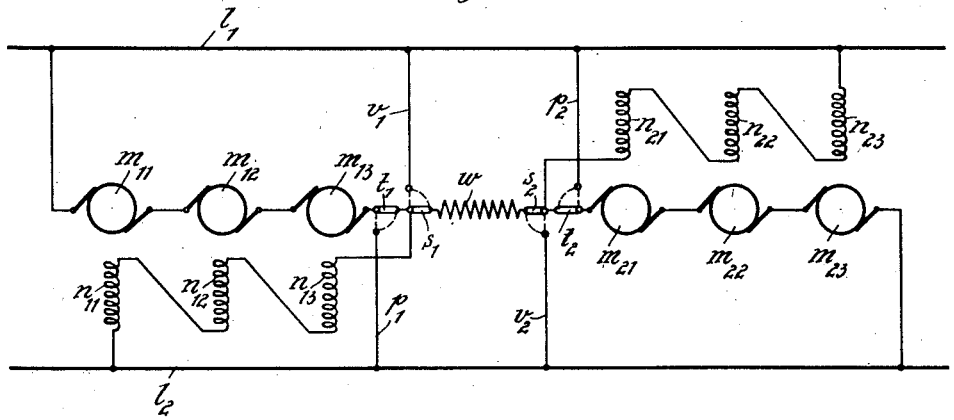
Figure 6:
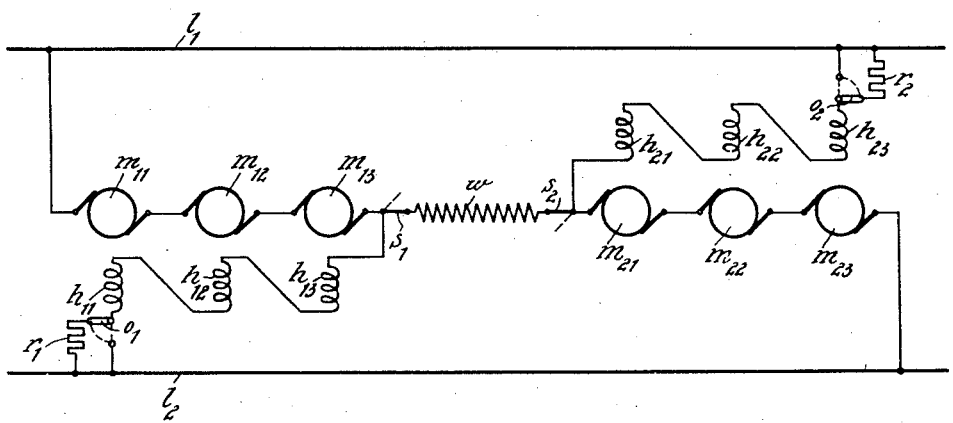

Fig. 3 illustrating the arrangement having each field winding composed of a plurality of branches;

Fig. 4 illustrating the same arrangement as Fig. 3 except that the plurality of field winding branches are connected in series;

Fig. 5 illustrating an arrangement similar to Fig. 1, except that two groups, each containing three shunt wound motors, are provided; and Fig. 6 illustrating an arrangement similar to Fig. 2, except that two groups, each containing three series wound motors, are provided.

Like reference characters designate like parts in all figures.

Referring to Fig. 1, $l_1$ and $l_2$ are the conductors of the supply circuit between which the motors $m_1$ and $m_2$ are connected. These machines, when operating as motors, are connected, together with their respective field winding $n_1$, $n_2$, as individual independent shunt motor units across the supply mains $l_1$, $l_2$, so long as switches $s_1$, $s_2$ and $t_1$, $t_2$, are thrown into the position shown in dotted lines. When these machines are to be used for regenerative operation, their two armatures should be connected in series. According to the present invention this series connection is effected through a resistance $w$ when switches $s_1$, $s_2$, and $t_1$, $t_2$, are thrown into the position shown in full lines. Thereby field winding $n_1$, receiving its exciter current in the proper direction from armature $m_2$, acts as if it were a shunt winding to its own armature $m_1$, and field winding $n_2$, receiving its exciter current in the proper direction from armature $m_1$, acts as if it were a shunt winding to its own armature $m_2$. It will be noted that in each of these exciter circuits the resistance $w$ is included. If now the armatures $m_1$ and $m_2$ send current into the supply circuit a portion of the E. M. F. generated is consumed in the resistance, so that the exciting voltage for the windings $n_1$ and $n_2$ decreases with the increasing armature current. The direction of the current during the braking period is shown by the arrows in full lines and the voltage drop caused in the resistance during the passage of the braking current is indicated by the arrow in broken lines. It will be seen that the exciter voltage becomes the weaker the stronger the brake current grows.

Fig. 2 shows a similar arrangement for series motors. If in this figure switches $s_1$, $s_2$, are opened and switches $o_1$, $o_2$ are thrown into the position shown in dotted lines, the machines $m_1$, $m_2$, act as individual independent series motors. If for regenerative operation, during the braking period, the aforementioned four switches are thrown into the position shown in full lines, the field windings $h_1$, $h_2$, are placed into a circuit position similar to that in which field windings $n_1$, $n_2$, Fig. 1 are placed during the regeneration period. The only difference is that in Fig. 2 additional resistances $r_1$, $r_2$, are respectively connected in series with windings $h_1$, $h_2$, because these windings (being series motor windings) would have a resistance too low for the position of these windings in the circuits.

The energy losses caused by the series resistances $r_1$, $r_2$ may be reduced and the economy of the system considerably increased, if according to my invention double or, generally speaking, multiple branches of the magnet windings are connected in parallel during the operation of the machine as individual series motors, while these branches are connected in series for regenerative operation. For instance in the series field windings $e_1$, $e_2$ in Fig. 3, each consisting of two branches connected in parallel, these branches may be connected in series and when so connected may be energized as a shunt field winding for the respective motor, when switches $s_1$, $s_2$ are closed as Fig. 4 shows. In the case of four motors the field winding of two motors permanently connected in series may, for instance, be connected in parallel during the propelling period and in series during the braking period.

In Fig. 5 I have shown the arrangement of two groups of shunt wound motors, one group consisting of the armatures $m_{11}$, $m_{12}$, $m_{13}$, with their shunt fields $n_{11}$, $n_{12}$, $n_{13}$, the two groups being connected in accordance with the scheme shown in Fig. 1 and operating as described with reference to that figure.

In Fig. 6 I have shown how two groups of series wound motors may be arranged and operated in accordance with the scheme shown in and described with reference to Fig. 2. In Fig. 6 the armatures $m_{11}$, $m_{12}$, $m_{13}$ are provided with the series wound fields $h_{11}$, $h_{12}$, and $h_{13}$ and the armatures $m_{21}$, $m_{22}$, $m_{23}$ with the series wound fields $h_{21}$, $h_{22}$, $h_{23}$.

By the system of connection according to my invention the otherwise constant field of shuntwound motors is rendered somewhat responsive inasmuch as it decreases, so to say, during the increase of the return current, so that the exclusive influence of the increasing speed with a constant field is weakened. In this way the regenerated current grows only gradually to its maximum value and the motors and the supply circuit are protected against detrimental current surges. By the omission of large steadying resistances the first cost as well as the operating expenses are reduced and the economy of the plant is considerably increased.

It will be understood that my invention is by no means confined to propelling motors for electrical vehicles, but may equally well be applied to twisting motors and generally be used in all installations in which an excess of mechanical energy is to be reconverted into electrical energy.

What I claim as my invention and desire to secure by Letters Patent is:

1. In a regenerative braking system, the combination of a source of current, a pair of direct current motors provided with armature and field windings, means for connecting the motors to the source of current independently to provide separate motor circuits, and a resistor for inter-connecting the motor circuits during the braking period in such a manner that the two armatures are connected in series in one circuit including the source of current and the two field windings are connected in series in another circuit, including the source of current, the resistor forming a common conductor for both circuits, whereby the exciting voltage of said field windings is varied in inverse ratio to the armature current during the braking period.

2. In a regenerative braking system, the combination of a source of current, a pair of direct current motors provided with armature and field windings, means for connecting the motors to the source of current independently to provide separate motor circuits, a resistor for interconnecting the motor circuits during the braking period in such a manner that the two armatures are connected in series in one circuit including the source of current and the two field windings are connected in series in another circuit including the source of current, the resistor forming a common conductor for both circuits, whereby the exciting voltage of said field windings is varied in inverse ratio to the armature current during the braking period, and a resistance connected in series with each field winding between one main of the source of current and the nearer end of said resistor.

3. In a regenerative braking system, the combination of a source of current and an even number of direct current motors, each having an armature and a field winding, said motors being divided into two groups, the armatures in each of said groups being arranged in series, the field windings in each of said groups being also arranged in series, all the armatures in each group being arranged in series with all the field windings of that group, and the field windings of the two groups being connected respectively with the two mains of the system, the armatures of one group being connected to the same main to which the field windings of the other group are connected, a common resistance arranged between the groups and connecting the armatures and the field windings of the two groups respectively in series with each other, to form two parallel circuits crossing each other through said resistance, for varying the exciting voltage of said field windings at inverse ratio to the current flowing through the armatures during the braking period.

4. In a regenerative braking system, the combination of a source of current and an even number of direct current motors, each having an armature and a field winding, said motors being divided into two groups, the armatures in each of said groups being arranged in series, the field windings in each of said groups being also arranged in series, all the armatures in each group being arranged in series with all the field windings of that group, and the field windings of the two groups being connected respectively with the two mains of the system, the armatures of one group being connected to the same main to which the field windings of the other group are connected, a common resistance arranged between the groups and connecting the armatures and the field windings of the two groups respectively in series with each other, to form two parallel circuits crossing each other through said resistance, for varying the exciting voltage of said field windings at inverse ratio to the current flowing through the armatures during the braking period, and an additional resistance removably connected between the field windings of each group and the point at which each field winding is connected to the main.

In testimony whereof I affix my signature.

HEINRICH OSBORNE.

CERTIFICATE OF CORRECTION.

Patent No. 1,726,276.   Granted August 27, 1929, to

HEINRICH OSBORNE.

It is hereby certified that error appears in the above numbered patent requiring correction as follows: In the heading to the printed specification, line 6, date of filing foreign application, for "March 23, 1928" read March 28, 1923; and that the said Letters Patent should be read with this correction therein that the same may conform to the record of the case in the Patent Office.

Signed and sealed this 9th day of December, A. D. 1930.

(Seal)

M. J. Moore,
Acting Commissioner of Patents.